(12) United States Patent
Larvor

(10) Patent No.: US 12,122,456 B2
(45) Date of Patent: Oct. 22, 2024

(54) PASSENGER COMPARTMENT ELEMENT FOR A MOTOR VEHICLE

(71) Applicant: Nissan Motor Co., Ltd., Yokohama (JP)

(72) Inventor: Philippe Larvor, Voisins le Bretonneux (FR)

(73) Assignee: Nissan Motor Co., Ltd., Yokohama (JP)

( * ) Notice: Subject to any disclaimer, the term of this patent is extended or adjusted under 35 U.S.C. 154(b) by 714 days.

(21) Appl. No.: 17/295,915

(22) PCT Filed: Dec. 16, 2019

(86) PCT No.: PCT/EP2019/085343
§ 371 (c)(1),
(2) Date: May 21, 2021

(87) PCT Pub. No.: WO2020/127044
PCT Pub. Date: Jun. 25, 2020

(65) Prior Publication Data
US 2022/0017153 A1    Jan. 20, 2022

(30) Foreign Application Priority Data

Dec. 21, 2018 (FR) ...................... 1873914

(51) Int. Cl.
*B62D 25/14* (2006.01)
*B62D 25/20* (2006.01)

(52) U.S. Cl.
CPC ....... *B62D 25/2045* (2013.01); *B62D 25/145* (2013.01); *B62D 25/2036* (2013.01)

(58) Field of Classification Search
None
See application file for complete search history.

(56) References Cited

U.S. PATENT DOCUMENTS

| 4,274,646 A | 6/1981 | Olligschlager et al. |
| 7,458,632 B2 * | 12/2008 | Yamada ............... B62D 29/008 296/193.07 |
| 2006/0162481 A1 | 7/2006 | Sato |

FOREIGN PATENT DOCUMENTS

| DE | 198204542 | * 11/1999 |
| JP | 9-164925 A | 6/1997 |
| JP | 2013-14161 A | 1/2013 |

* cited by examiner

*Primary Examiner* — Joseph D. Pape
(74) *Attorney, Agent, or Firm* — Global IP Counselors, LLP

(57) ABSTRACT

A passenger compartment element is provided for a motor vehicle. The passenger compartment element includes a crossmember and a strut. The strut is provided with a first end and a second end. The first end is secured to the crossmember. The second end is configured to be fastened to a firewall of the vehicle.

9 Claims, 6 Drawing Sheets

PASSENGER COMPARTMENT ELEMENT FOR A MOTOR VEHICLE

CROSS-REFERENCE TO RELATED APPLICATIONS

This application is a U.S. national stage application of International Application No. PCT/EP2019/085343, filed on Dec. 16, 2019, which claims priority to French Application No. 1873914.

BACKGROUND

Technical Field

The present application relates to a passenger compartment element for a motor vehicle and to an assembly for a motor vehicle comprising such a passenger compartment element.

Background Information

The methods for assembling motor vehicles generally involve creating an assembly consisting of a floor and a passenger compartment element. These elements are fastened to one another to form a part of the body of the motor vehicle. The passenger compartment element is commonly referred to by those skilled in the art as the "cockpit".

According to one conventional arrangement, the passenger compartment element is secured by means of a strut which is fastened to the floor. By virtue of this arrangement, the assembly consisting of the floor and the passenger compartment element is securely fastened.

Electric vehicles either have no tunnel above the floor or have only a much smaller tunnel. In this case, the presence of the strut makes it impossible to entirely free up the space between the floor and an air conditioning unit of the vehicle. Thus, the above-mentioned conventional arrangement creates the impression of a lack of space for the occupants of the electric vehicle. Moreover, the space taken up above the floor by the strut is also perceived to be a drawback—albeit less so—in motor vehicles other than electric vehicles.

Furthermore, numerous parts, including an accelerator pedal and an air conditioning unit, must be incorporated close to the floor and to the passenger compartment element. These parts take up a lot of space in the installation region of the assembly. However, it is necessary to provide a substantial installation clearance in order that the strut can be fastened to the floor. As a result, few alternatives have been proposed for creating an assembly comprising a floor and a passenger compartment element, in particular in order to free up a space above the floor.

SUMMARY

The invention aims to remedy the above-mentioned drawbacks.

More particularly, the invention aims to provide an assembly comprising a floor and a passenger compartment element in which a space is freed up above the floor, while taking into account the installation constraints and the space taken up by the various parts in the region where the assembly is to be installed.

To that end, there is proposed a passenger compartment element for a motor vehicle, comprising a crossmember and a strut, the strut having a first end and a second end, the first end being secured to the crossmember.

According to one general feature of this element, the second end is intended to be fastened to a firewall of the vehicle.

This frees up a space above the floor, which gives an impression of space which the occupants of the motor vehicle can appreciate, most particularly if the vehicle is an electric motor vehicle.

Preferably, the strut comprises a fastening region, the passenger compartment element comprising a potentiometer secured to the fastening region.

The potentiometer fastened in this manner to the passenger compartment element makes it easier to install the strut on the firewall. In particular, when compared to a conventional arrangement in which the installer was hampered by the presence of the potentiometer and/or of the accelerator pedal, the strut installation clearance is increased.

Preferably, the fastening region is between the second end and a point located between the first end and a second end and at a distance, relative to the second end, of less than one tenth of the length of the strut.

Advantageously, the strut comprises an added part, the fastening region being on the added part.

The added part makes it possible for a potentiometer receiving one end of an accelerator pedal stem to be offset along the lateral axis of the vehicle. This makes it possible to modify the shape of a stem of the accelerator pedal, for example by using a straight stem.

Preferably, the added part comprises a fastening lug.

The fastening lug provides another means for fastening the passenger compartment element to another element of the assembly consisting of the passenger compartment element and the floor. This results in better rigidity of the assembly.

Multiple variants of the design of the strut may be provided.

According to a first variant, the strut comprises a planar surface connecting the first end and the second end, the planar surface being parallel, when the passenger compartment element is installed on a vehicle, to a longitudinal plane of the vehicle.

A variant of this kind makes it possible to install a potentiometer and/or an accelerator pedal on the right (relative to the vehicle) of the strut. This brings about a minimal space requirement while retaining the installation clearance necessary for fastening the strut to the firewall.

According to a second variant, the strut comprises a first planar surface adjacent to the first end and a second planar surface connecting the first planar surface to the second end, the first planar surface being parallel, when the passenger compartment element is installed on a vehicle, to a longitudinal plane of the vehicle and the first planar surface intersecting the second planar surface.

The second variant makes it possible to install a potentiometer and/or an accelerator pedal on the left (relative to the vehicle) of the strut. Compared to the first variant, by swapping the position of the second end with the position of the potentiometer and/or of the accelerator pedal, this retains a minimal space requirement and the installation clearance necessary for fastening the strut to the firewall.

In one embodiment, an angle formed between the first planar surface and the second planar surface is between 10° and 30°.

Another aspect proposes an assembly for a motor vehicle comprising a floor, a firewall fastened to the floor and a passenger compartment element as defined hereinabove, wherein the second end is fastened to the firewall.

Another aspect proposes a method for installing an assembly as defined hereinbelow, and comprising fastening the firewall to the floor, positioning the passenger compartment element with respect to the floor and to the firewall, and fastening the second end to the firewall.

Other aims, features and advantages of the invention will appear upon reading the following description, provided solely by way of non-limiting example, with reference to the appended drawings.

DETAILED DESCRIPTION OF EMBODIMENTS

Figure 1:
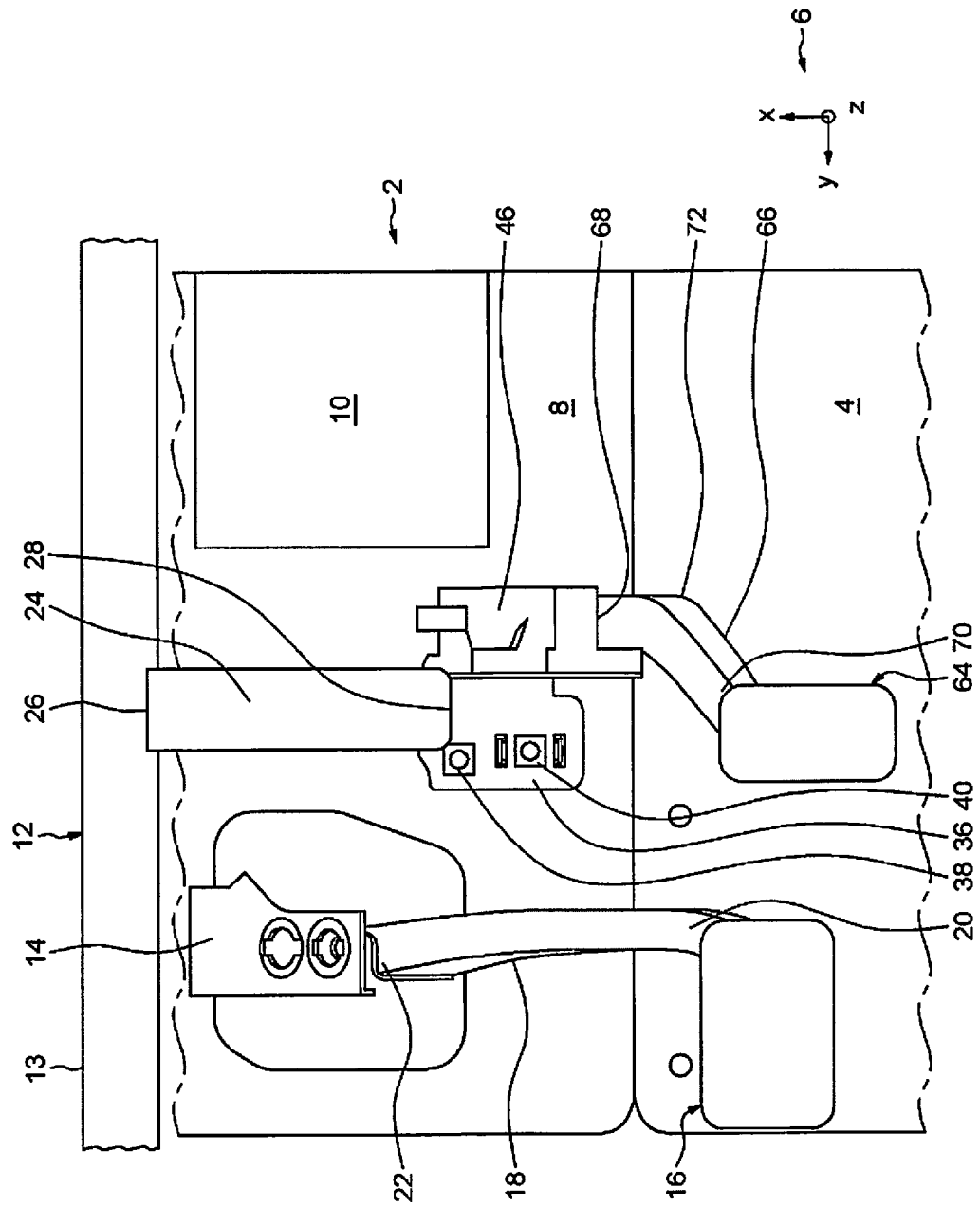
FIG. 1 is a rear view of an assembly according to a first embodiment.

An embodiment for implementing the charging method according to the present disclosure will be described below based on an embodiment illustrated in the drawings.

Figure 2:
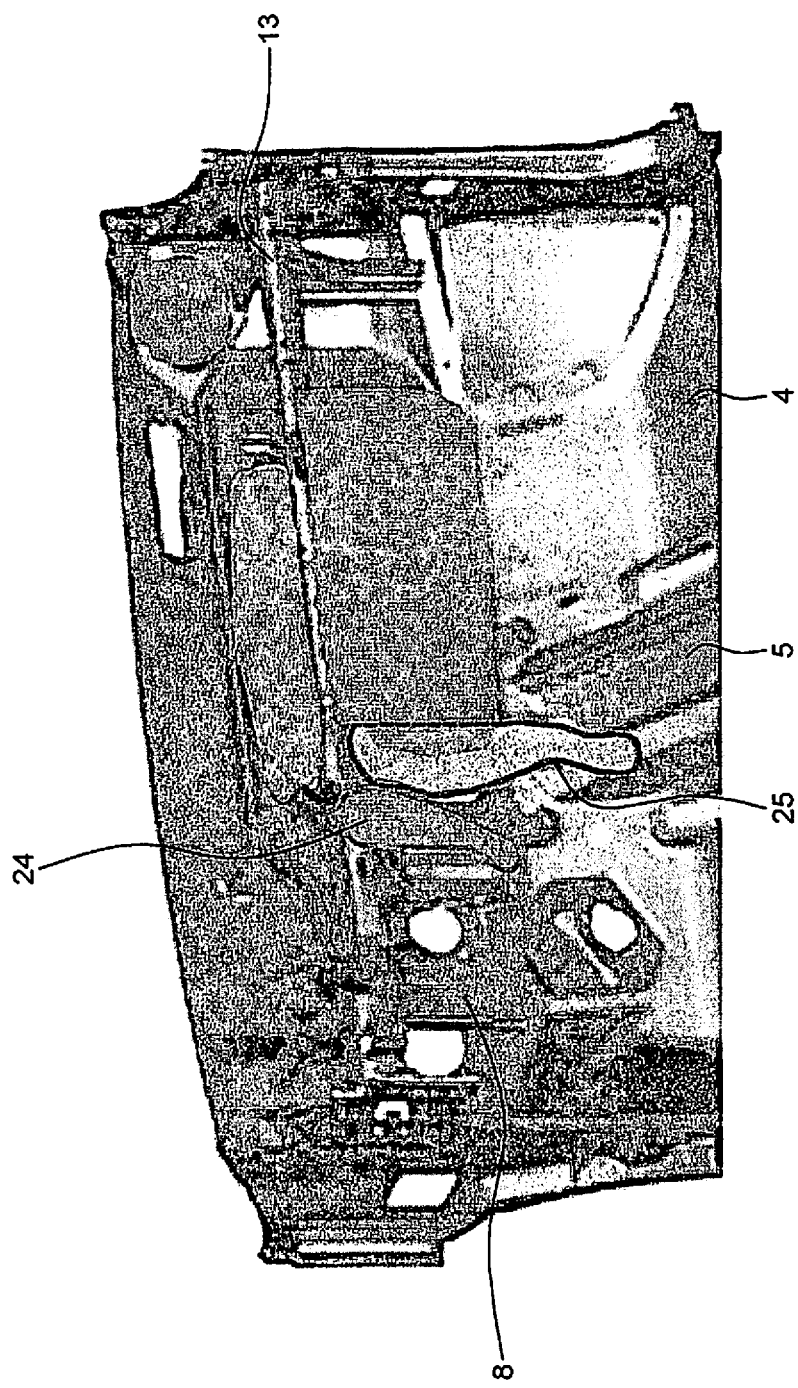
FIG. 2 is another view of the assembly of FIG. 1.

FIGS. 1 and 2 schematically show an assembly 2 according to a first embodiment. The assembly 2 is intended to be incorporated into an electric-drive motor vehicle. However, it is of course possible, without departing from the scope of the invention, to envisage incorporating the assembly 2 into another type of motor vehicle, for example a hybrid vehicle or a vehicle having an internal combustion engine.

The assembly 2 comprises a floor 4. A direct orthonormal vector base 6 attached to the floor 4 is defined. The base 6 consists of a vector X, a vector Y and a vector Z. When the assembly 2 is normally incorporated onto a motor vehicle, the vector X is directed along the longitudinal direction of the vehicle and toward the front of the vehicle, the vector Y is directed along the lateral direction of the vehicle and the vector Z is oriented vertically upward.

Unless otherwise stated, the terms "front", "rear", "left", "right", "lower" and "upper" will be understood as referring to a vehicle on which the assembly 2 is normally incorporated. In other words, the terms "front" and "rear" refer to the direction of the vector X, the origin end of the vector X being to the rear and the head of the vector X being to the front. The terms "left" and "right" refer to the direction of the vector Y, the origin end of the vector Y being to the right and the head of the vector Y being to the left. The terms "lower" and "upper" refer to the direction of the vector Z, the origin end of the vector Z being lower and the head of the vector Z being upper.

The assembly 2 comprises a firewall 8. The firewall 8 serves to define a boundary between a motor compartment and a passenger compartment of the motor vehicle. The firewall 8 is fastened by welding to the floor 4. However, it is of course possible to envisage another way of fastening the floor 4 to the firewall 8.

The assembly 2 comprises a clevis 14 and a brake pedal 16. The clevis 14 is mechanically connected by an embedded connection with the firewall 8. The pedal 16 is extended by a stem 18 having an end 20 that is adjacent to the pedal 16 and an opposite end 22 from the pedal 16. The end 22 is received in the clevis 14.

The assembly 2 comprises an air conditioning device 10. The device 10 is fastened to the firewall 8. The device 10 is located in relative terms on the right of the firewall 8.

The assembly 2 comprises a passenger compartment element 12. The element 12 consists of multiple parts which are initially assembled with one another prior to being secured to the floor 4 and to the firewall 8.

The element 12 comprises a body 13. In this case, the body 13 consists of a crossmember. However, it is of course possible to envisage, without departing from the scope of the invention, a body having a different design.

The assembly 12 comprises a strut 24. The strut 24 is oblong in shape and extends longitudinally between two ends 26 and 28.

At the end 26, the strut 24 is mechanically connected by an embedded connection on the body 13.

FIG. 2 shows, schematically, the floor 4, the firewall 8, the body 13 consisting of a crossmember and the strut 24. FIG. 2 shows a prior art strut 25. The strut 25 is shown purely by way of illustration and does not form part of the assembly 12. In that respect, the strut 25 is depicted in dotted lines in FIG. 2. The strut 25 is installed on the floor 4. More specifically, the strut 25 is installed on a tunnel 5 extending above the floor 4. The schematic representation of FIG. 2 makes it possible to compare the strut 25 according to the prior art and the strut 24 according to the invention.

Figure 3:
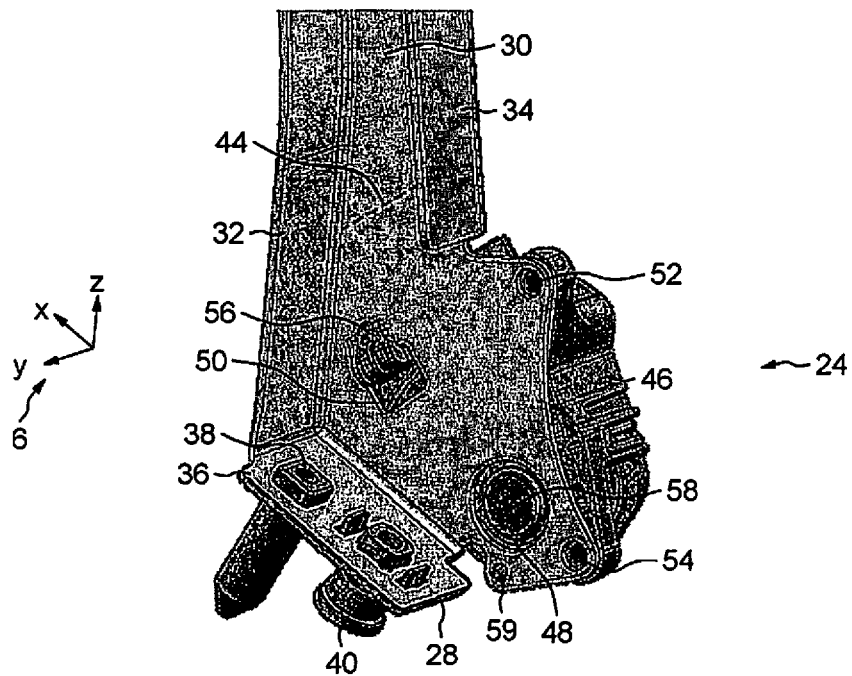
FIG. 3 is a perspective view of a strut of the assembly of FIGS. 1 and 2.
Figure 4:
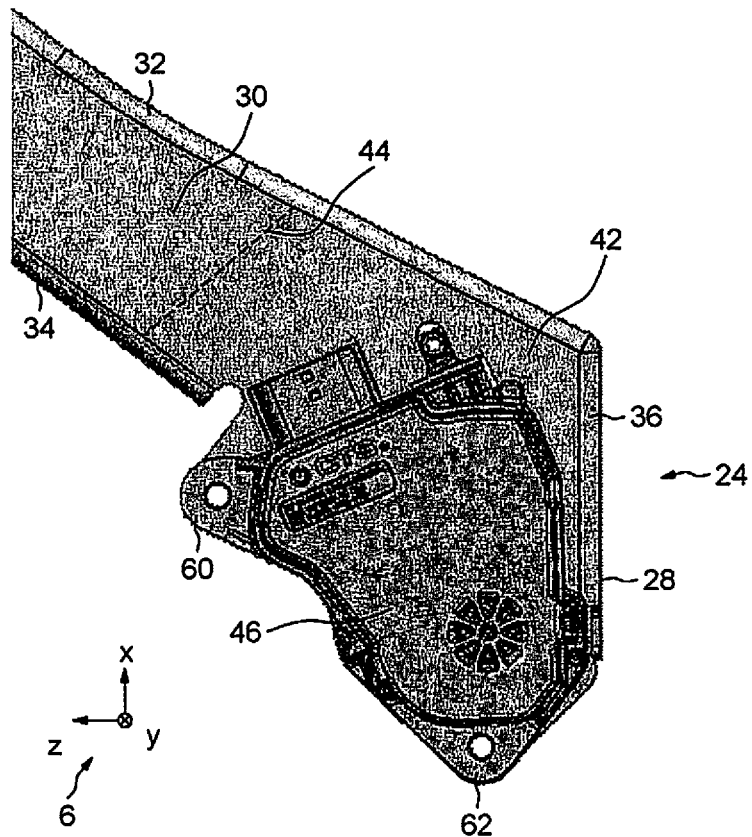
FIG. 4 is a side view of the strut of FIG. 3.

With reference to FIGS. 3 and 4, the strut 24 comprises a planar surface 30. The surface 30 extends longitudinally from the end 26 to the end 28. The surface 30 is extended by two lateral rims 32 and 34. The rim 32 is joined to an edge of the surface 30 located relatively toward the front and the rim 34 is joined to an edge of the surface 30 located relatively towards the rear. The rims 32 and 34 project from the surface 30 in the direction of the vector Y and in a sense counter to the sense of the vector Y.

At the end 28, the strut 24 has an end rim 36. The rim 36 projects from the surface 30 in the direction of the vector Y and in a sense counter to the sense of the vector Y. Thus, the rim 36 forms a plate perpendicular to the direction of the vector Z. The rim 36 comprises two through-bores 37 and 39 (not shown in FIGS. 1 to 4) that receive fastening means 38 and 40 (shown in FIGS. 1 and 3).

Elements 38 and 40 are intended to cooperate with corresponding fastening means (not shown) of the firewall 8. This makes it possible to fasten the strut 24 by its end 28 to the firewall 8, so as to form the assembly 2.

With reference to FIGS. 3 and 4, the strut 24 comprises a fastening region 42 that extends longitudinally close to the end 28. In the Figures, the region 42 is delimited schematically by a dotted line 44.

As shown in FIGS. 3 and 4, a potentiometer 46 is fastened to the region 42. Preferably, the potentiometer 46 takes up between half and one-third of the surface of the region 42. The potentiometer 46 is positioned on a surface of the fastening region 42 that is cantilevered with respect to one of the first and second ends 26 and 28 of the strut 24.

As shown in FIG. 3, the region 42 comprises a through-hole 48, a rectangular through-aperture 50, two through-openings 52 and 54. The aperture 50 is intended to receive a hook 56 of the potentiometer 46. The hole 48 is intended to receive a boss 58 of the potentiometer 46. A projection 59 of the potentiometer 46 is further received in an additional opening (not referenced) of the region 42. By means of the hook 56, the boss 58 and the projection 59, the potentiometer 46 can provisionally be fastened to the region 42. Then, screws (not shown) are passed through fastening lugs 60 and 62 of the potentiometer 46, then through the openings 52 and 54 to definitively fasten the potentiometer 46 to the region 42.

Once again with reference to FIG. 1, the element 12 comprises an accelerator pedal 64 which is extended by a stem 66. The stem 66 comprises an end 68 that is connected to the potentiometer 46 and an end 70 that is connected to the pedal 64. Between the ends 68 and 70, the stem 66 has a curvature 72 by means of which it is possible to compensate for the offset of the potentiometer 46 with respect to the pedal 64 in the direction of the vector Y.

Figure 5:
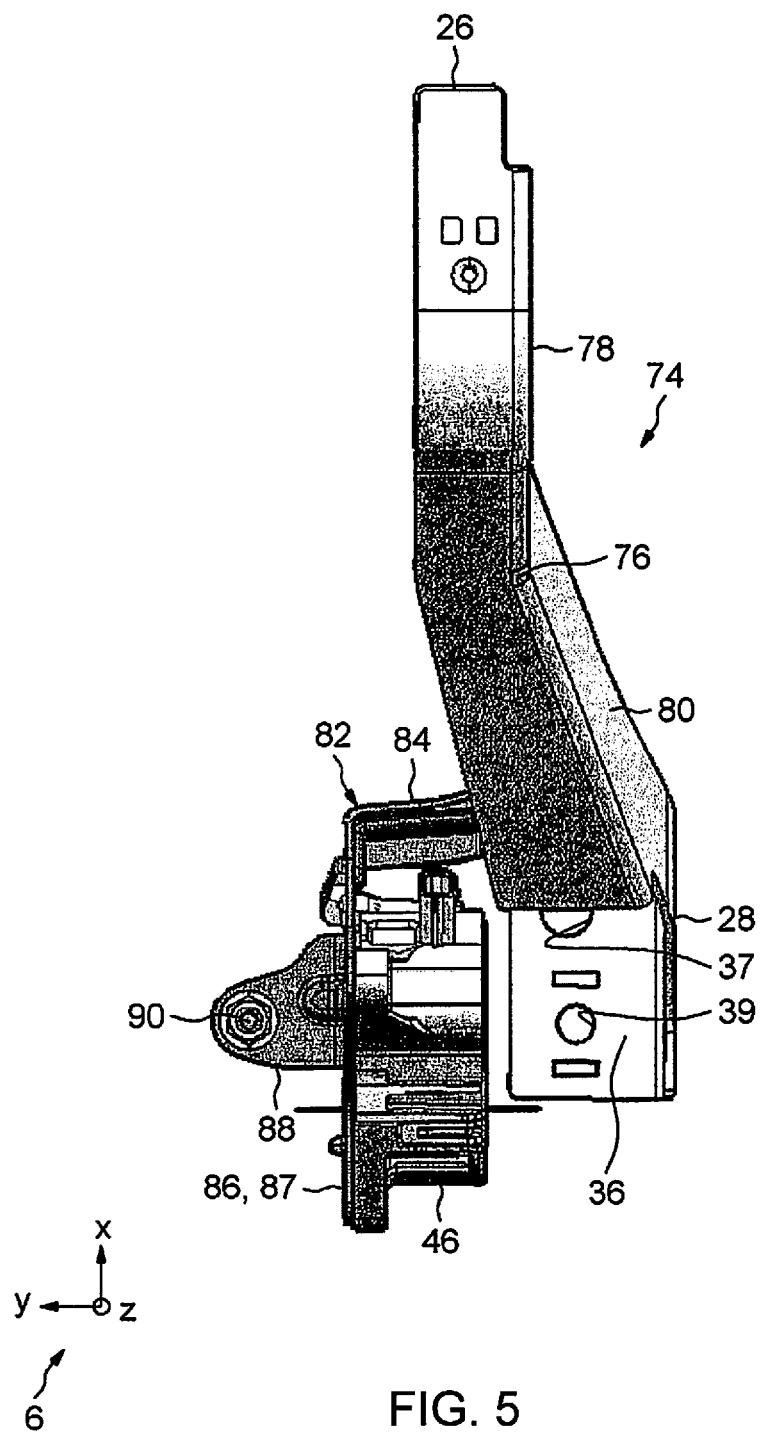
FIG. 5 is a rear view of a strut fitted to an assembly according to a second embodiment.
Figure 6:
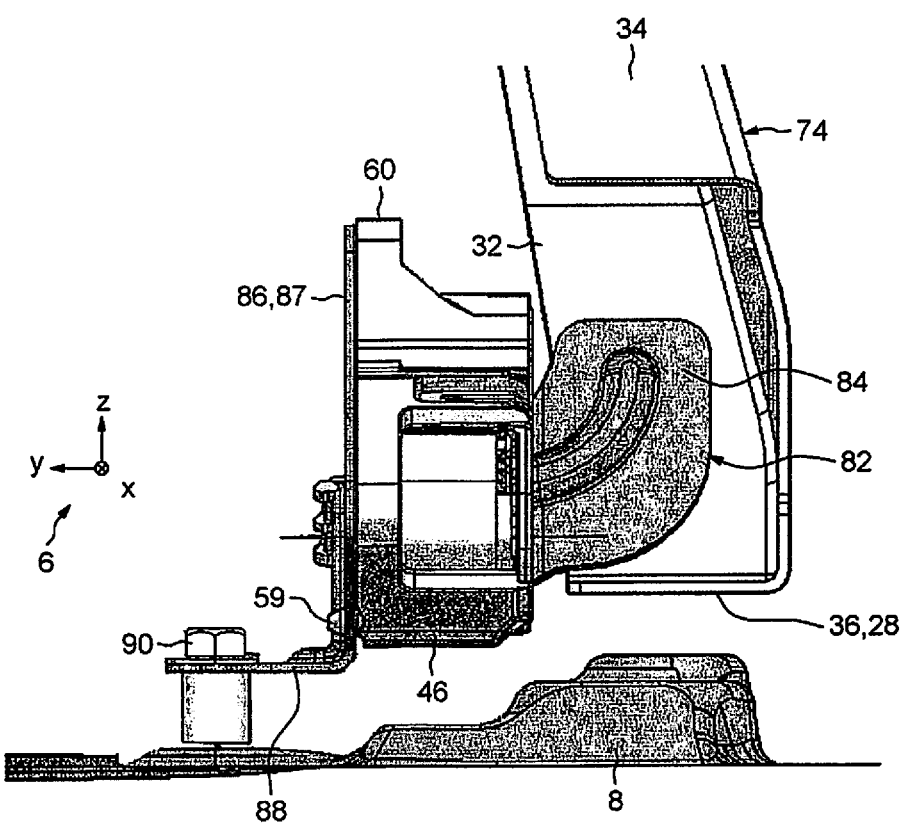
FIG. 6 is a top view the strut of FIG. 5.
Figure 7:
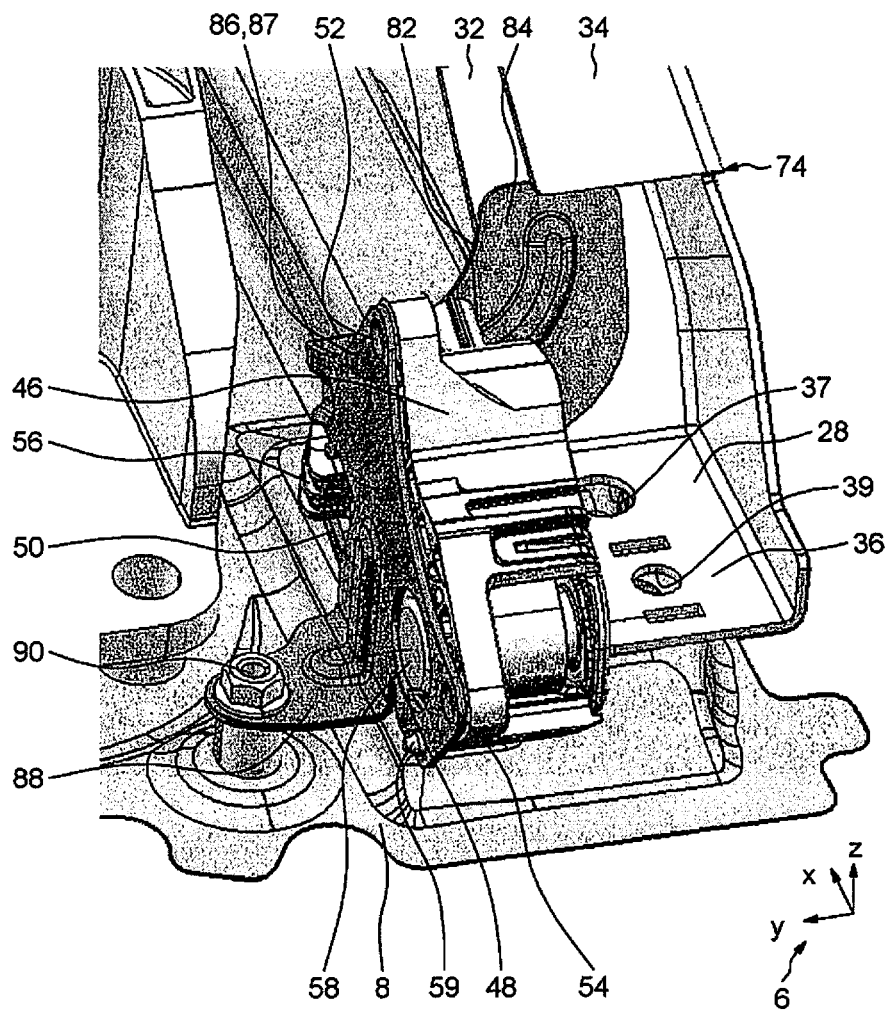
FIG. 7 is a perspective view of the strut of FIGS. 5 and 6.

FIGS. 5 to 7 schematically show a strut 74 according to a second embodiment of the invention. The strut 74 is designed to be incorporated into an assembly such as the assembly 2 consisting of the floor 4 and the firewall 8. Identical elements bear the same references.

With reference to FIG. 5, the strut 74 comprises an angle region 76, a first planar surface 78 and a second planar surface 80. The surface 78 extends longitudinally from the end 26 to the region 76. The surface 80 extends longitudinally from the end 28 to the region 76. The surface 78 is perpendicular to the vector Y. The surface 80 forms an angle alpha of between 10° and 30° with respect to the surface 78. However, since the angle alpha is dependent on the environment of the strut 74, it is of course possible to envisage a different value without departing from the scope of the invention.

The strut 74 differs from the strut 24 in that it has no fastening region 42. The strut 74 further differs from the strut 24 in that it comprises an added part 82. The part 82 comprises a tab 84 and a plate 86. The plate 86 is similar in shape to the surface that constitutes the region 42 of the strut 24. In particular, the plate 86 comprises the hole 48, the aperture 50 and the openings 52 and 54. With reference to FIGS. 6 and 7, the tab 84 is pressed and welded to the rim 32. In this way, the part 82 is secured to the strut 74.

The plate 86 forms a fastening region 87 to allow the potentiometer 46 to be installed in a manner similar to the installation on the region 42 of the strut 24.

The part 82 also comprises a rim 88 that extends from the plate 86 and perpendicular to the vector Z. The rim 88 forms a fastening lug receiving a bolt 90 that is received in an orifice (not referenced) of the firewall 8.

The part 82 makes it possible to fasten the potentiometer 46 to the strut 74 without giving rise to an offset in the direction of the vector Y between the pedal 64 and the end 68 of the stem 66 opposite the pedal 64. This results in the possibility of not causing an additional space requirement when the strut has an angle region.

As shown in FIG. 7, the region 87 is, in this embodiment, partially offset towards the rear of the end 28. Thus, the use of a plate permits a greater degree of freedom for positioning the fastening region 87.

Although the part 82 has been used only in the second embodiment, it is of course possible, without departing from the scope of the invention, to envisage using an identical or similar added part in a different embodiment, in particular in the first embodiment.

Figure 8:
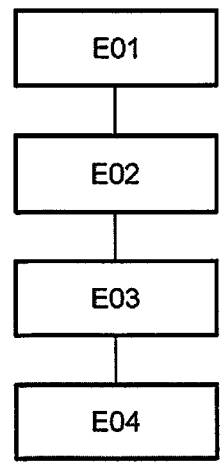
FIG. 8 illustrates a method for installing the assembly of FIGS. 1 and 2.

To create the assembly 2, it is possible to implement the method represented in the flowchart of FIG. 8.

A first step E01 involves joining the floor 4 and the firewall 8 using an embedded mechanical connection.

Prior to, after or at the same time as the step E01, a second step E02 of creating the element 12 by fastening the strut 24 or 74, the potentiometer 46 and the pedal 64 to the body 13 is carried out. The pedal 64 is fastened to the potentiometer 46.

A third step E03, of positioning the element 12 with respect to the elements 4 and 8, is carried out after steps E01 and E02.

A fourth step E04, of fastening the end 28 of the strut 24 or 74 to the firewall 8, is carried out after step E03. The assembly 2 is then finished.

The two described embodiments make it possible to free up a space above the floor 4 without impairing the installation of the strut 24 or 74 on the assembly 2. More particularly, since the potentiometer 46 is fastened to the strut 24 or 74, the size of the clevis 14 can be reduced, by virtue of which it is possible to increase the installation clearance of the end 28. This freed-up space is clearly shown in FIG. 2, which shows both the prior art strut 25 and a strut 24 according to the invention. This makes the installation of the end 28 of the strut 24 or 74 on the firewall 8 possible under good conditions.

The invention claimed is:

1. A passenger compartment element for a vehicle, the passenger compartment element comprising:
    a crossmember;
    a strut having a first end and a second end, the first end being secured to the crossmember, and the second end being configured to be fastened to a firewall of the vehicle; and
    a potentiometer secured to a fastening region of the strut, the potentiometer being positioned on a surface of the fastening region that is cantilevered with respect to one of the first and second ends of the strut.

2. The passenger compartment element as claimed in claim 1, wherein
    the fastening region is between the second end and a point located between the first end and the second end.

3. The passenger compartment element as claimed in claim 1, wherein
    the strut comprises an added part, the fastening region being on the added part.

4. The passenger compartment element as claimed in claim 3, wherein
    the added part comprises a fastening lug.

5. The passenger compartment element as claimed in claim 1, wherein
    the strut comprises a planar surface connecting the first end and the second end, the planar surface being parallel to a longitudinal plane of the vehicle when the passenger compartment element is installed on a vehicle.

6. The passenger compartment element as claimed in claim 1, wherein
    the strut comprises a first planar surface adjacent to the first end and a second planar surface connecting the first planar surface to the second end, the first planar surface being parallel to a longitudinal plane of the vehicle and the first planar surface intersecting the second planar surface when the passenger compartment element is installed on a vehicle.

7. The passenger compartment element as claimed in claim 6, wherein
    an angle formed between the first planar surface and the second planar surface is between 10° and 30°.

8. A vehicle assembly including the passenger compartment element as claimed in claim 1, and further comprising;
    a floor; and a firewall fastened to the floor, the second end of the passenger compartment element being fastened to the firewall.

9. A method for installing the vehicle assembly as claimed in claim 8, comprising:
fastening the firewall to the floor,
positioning the passenger compartment element with respect to the floor and to the firewall, and
fastening the second end to the firewall.

* * * * *